(12) United States Patent
Nakamura et al.

(10) Patent No.: US 9,169,927 B2
(45) Date of Patent: Oct. 27, 2015

(54) SHIFT CONTROL APPARATUS OF AUTOMATIC TRANSMISSION

(75) Inventors: Yusuke Nakamura, Shizuoka (JP); Hiroyuki Sato, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 826 days.

(21) Appl. No.: 13/020,847

(22) Filed: Feb. 4, 2011

(65) Prior Publication Data

US 2011/0224878 A1    Sep. 15, 2011

(30) Foreign Application Priority Data

Mar. 12, 2010 (JP) ................. 2010-055960

(51) Int. Cl.
| F16H 59/68 | (2006.01) |
| F16H 61/662 | (2006.01) |
| F16H 59/20 | (2006.01) |
| F16H 61/02 | (2006.01) |

(52) U.S. Cl.
CPC .......... *F16H 61/66259* (2013.01); *F16H 59/20* (2013.01); *F16H 2061/0227* (2013.01)

(58) Field of Classification Search
CPC .................. F16H 61/66259; F16H 2061/0227; F16H 59/20
USPC ............................................ 701/56
See application file for complete search history.

(56) References Cited

U.S. PATENT DOCUMENTS

| 5,995,895 | A * | 11/1999 | Watt et al. .................. 701/50 |
| 6,125,321 | A | 9/2000 | Tabata et al. |
| 6,178,372 | B1 | 1/2001 | Tabata et al. |
| 6,513,610 | B2 * | 2/2003 | Ochiai et al. .................. 180/176 |
| 6,547,691 | B2 * | 4/2003 | Hino .............................. 477/37 |
| 6,554,090 | B1 | 4/2003 | Kuroda et al. |
| 2002/0017413 | A1 | 2/2002 | Ochiai et al. |

(Continued)

FOREIGN PATENT DOCUMENTS

| DE | 60019493 T2 | 2/2006 |
| DE | 102006030528 A1 | 1/2008 |
| JP | 2-85559 A | 3/1990 |
| JP | 10-166900 A | 6/1998 |
| JP | 11-034694 A | 2/1999 |

(Continued)

OTHER PUBLICATIONS

Japanese Office Action (and English summary), dated Apr. 22, 2013, which issued during the prosecution of Japanese Patent Application No. 2010-055960, which corresponds to the present application.

*Primary Examiner* — John Q Nguyen
*Assistant Examiner* — Alan D Hutchinson
(74) *Attorney, Agent, or Firm* — Troutman Sanders LLP (57) ABSTRACT

There is provided a shift control apparatus of an automatic transmission in a vehicle including a constant speed traveling apparatus, which has a detecting device detecting a surrounding situation of the vehicle and operates according to the detected situation, and an automatic transmission capable of steplessly changing a transmission ratio, the shift control apparatus controlling the automatic transmission according to a shift map for changing the transmission ratio according to a traveling state. The shift control apparatus includes a plurality of shift maps, and a switching and selecting unit selecting and switching to one of the shift maps based on a shift-down request signal or a requested acceleration, which is outputted by a constant speed traveling control device of the constant speed traveling apparatus, according to the situation detected by the detecting device.

5 Claims, 6 Drawing Sheets

(56) References Cited

U.S. PATENT DOCUMENTS

2008/0125946 A1 5/2008 Fakler et al.
2008/0293541 A1* 11/2008 Kanafani et al. .............. 477/110

FOREIGN PATENT DOCUMENTS

| JP | 11-257477 A | 9/1999 |
| JP | 2002-048223 A | 2/2002 |

* cited by examiner

NORMAL SHIFT MAP

F I G. 5

LOW ACCELERATION SHIFT MAP (Sig=1)

F I G. 6

LOW ACCELERATION SHIFT MAP (Sig=4)

SHIFT CONTROL APPARATUS OF AUTOMATIC TRANSMISSION

CROSS-REFERENCE TO RELATED APPLICATIONS

This application is based upon and claims the benefit of priority of the prior Japanese Patent Application No. 2010-055960, filed on Mar. 12, 2010, the entire contents of which are incorporated herein by reference.

BACKGROUND OF THE INVENTION

1. Field of the Invention

The present invention relates to a shift control apparatus of an automatic transmission in a vehicle having a constant speed traveling apparatus and an automatic transmission capable of steplessly changing a transmission ratio.

2. Description of the Related Art

Among vehicles, there is one including a constant speed traveling apparatus, which has a detecting device detecting a surrounding situation of the vehicle and operates according to the detected situation, and an automatic transmission capable of steplessly changing a transmission ratio, and having a shift control apparatus controlling the automatic transmission according to a shift map for changing the transmission ratio according to a traveling state. A constant speed traveling control device of the constant speed traveling apparatus performs constant speed traveling control to travel at a preset speed when there is no preceding vehicle, or to maintain a preset inter-vehicle distance when there is a preceding vehicle, according to the surrounding situation of the vehicle detected by the detecting device.

Among conventional shift control apparatuses of an automatic transmission, as disclosed in Japanese Laid-open Patent Publication No. H2-85559, there is one that changes a change width of a transmission ratio of an automatic transmission (continuously variable transmission) in a vehicle having a constant speed traveling apparatus (constant speed traveling control device).

This shift control apparatus of the automatic transmission performs control to suppress the change width during constant speed traveling. Specifically, the apparatus sets an input shaft rotation speed of the automatic transmission to an intermediate band, and limits the control range, which is effective for keeping the traveling speed to be constantly in the vicinity of a set speed of constant speed traveling, and not to deviate largely from the set speed.

Further, among conventional shift control apparatuses of an automatic transmission, as disclosed in Japanese Patent Publication No. 3322207, there is a shift control apparatus having both an active cruise control apparatus as one among constant speed traveling apparatuses (constant speed traveling control devices) that includes a device detecting a surrounding situation of the vehicle, such as a radar sensor, and operates according to the detected situation, and a continuously variable transmission as one among automatic transmission apparatuses.

This shift control apparatus of the automatic transmission varies the gain of acceleration or deceleration between a normal time and a time when the constant speed traveling apparatus is operating.

In the conventional shift control apparatus of the automatic transmission, shift control in constant speed traveling control by the constant speed traveling apparatus assists the constant speed traveling control by the constant speed traveling control device according to a normal shift map as a base. However, one shift map is unable to respond to various traveling situations. For example, the one shift map provides a poor drivability such that a brake hunting occurs due to following only with a brake during traveling on a downhill road, or acceleration does not meet a demand when a preceding vehicle accelerates or during traveling on an uphill road, worsening a following ability.

The technique of Japanese Laid-open Patent Publication No. H2-85559 can give comfort by suppressing speed changes in the case of a vehicle traveling alone with almost no traffic around, or the like, but is still unable to respond to all of a variety of traveling situations of a vehicle.

For example, first, when the constant speed traveling apparatus has an obstacle detecting device such as a radar sensor and adjusts the traveling speed automatically to maintain an inter-vehicle distance, the apparatus needs to perform appropriate control corresponding to the traveling speed of a preceding vehicle or to merging or departing of a vehicle when such an event happens.

Further, control must be performed to give a large acceleration or deceleration in response to a sudden change in the traveling situation, and meanwhile, in a situation with a small change, such a large acceleration or deceleration should rather be avoided to give priority to the comfort.

Also, when there is a change in inclination or declination on an uphill road or down hill road in the road environment, control must be performed to respond also to such change.

In a complex traveling situation of a vehicle including these points, for example, the case where the vehicle becomes slower than a preceding vehicle when returning to a set speed from a speed lower than the set speed on an uphill road, the case where speed control only with shift control and output control becomes insufficient when the vehicle is following a slow preceding vehicle on a steep downhill road, and brake control intervenes intermittently and frequently, or the like, it is most desirable to perform appropriate control to meet a demand responding to expectations in such a traveling situation. Inability to do this gives the driver a feeling of poor following ability or low drivability.

In the system of Japanese Patent Publication No. 3322207, an engine braking control gain (amount of change in transmission ratio per control cycle for engine brake control) is varied between a normal time and a time when the constant speed traveling apparatus is operating, but the acceleration and the deceleration are the same. Accordingly, there is still room for improvement in making a change according to the complex traveling situation of a vehicle when acceleration or deceleration is performed responding to a demand of the constant speed traveling apparatus in operation.

SUMMARY OF THE INVENTION

The present invention has objects to perform shift control with an appropriate speed controllability in many traveling situations corresponding to the variety of these situations, to particularly have a speed controllability ensuring sufficient acceleration performance to keep up with the flow of surrounding vehicles, and to perform shift control while suppressing intervention of braking control (brake control) as much as possible.

A shift control apparatus of an automatic transmission of the present invention is a shift control apparatus of an automatic transmission in a vehicle including a constant speed traveling apparatus, which has a detecting device detecting a surrounding situation of the vehicle and operates according to the detected situation, and an automatic transmission capable of steplessly changing a transmission ratio, the shift control apparatus controlling the automatic transmission according to a shift map for changing the transmission ratio according to a traveling state. The shift control apparatus includes a plurality of shift maps, and a switching and selecting unit selecting and switching to one of the shift maps based on a shift-down request signal or a requested acceleration, which is outputted by a constant speed traveling control device of the constant speed traveling apparatus, according to the situation detected by the detecting device.

DETAILED DESCRIPTION OF THE PREFERRED EMBODIMENTS

Hereinafter, a preferred embodiment of the present invention will be described in detail with reference to the attached drawings.

Figure 1:
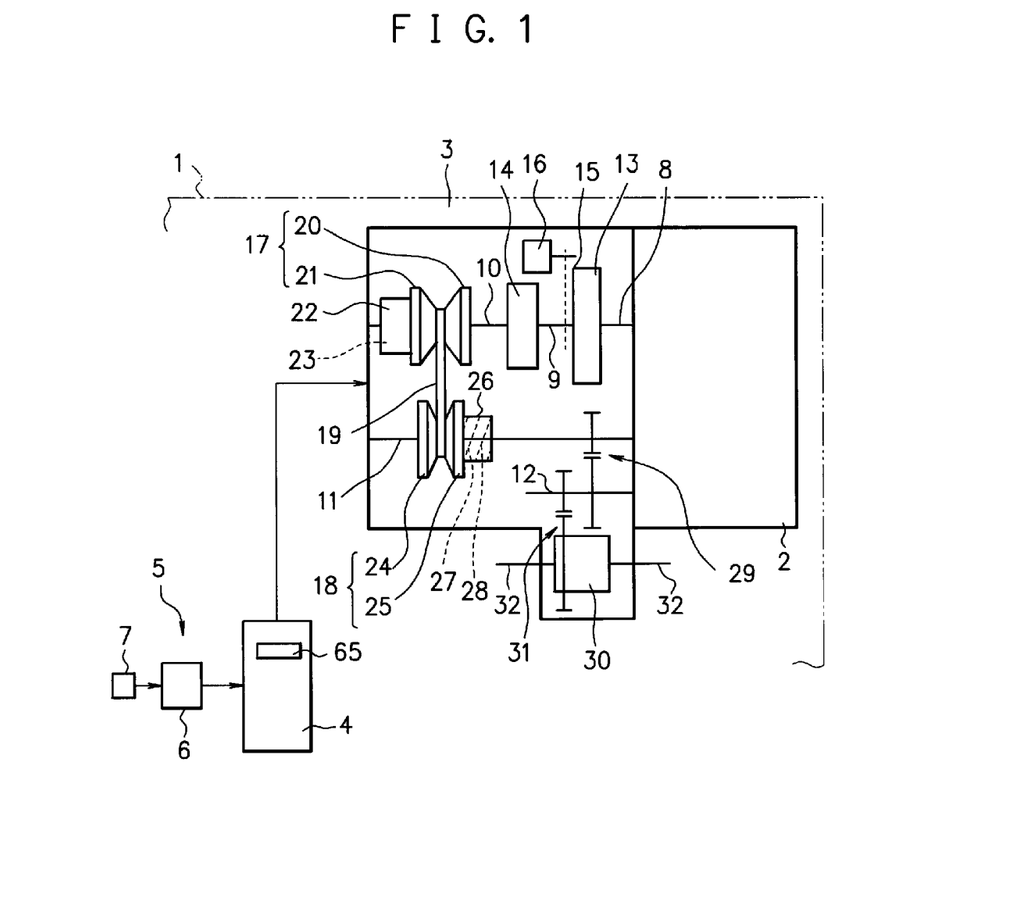
FIG. 1 is a diagram illustrating a system structure including a shift control apparatus of an automatic transmission according to an embodiment.

FIG. 1 is a diagram illustrating a system structure including a shift control apparatus of an automatic transmission according to the embodiment. Numeral 1 denotes a vehicle. Numeral 2 denotes an engine (internal combustion engine) mounted in the vehicle 1. Numeral 3 denotes an automatic transmission coupled to the engine 2. Numeral 4 denotes a shift control apparatus of the automatic transmission 3. Numeral 5 denotes a constant speed traveling apparatus of the vehicle 1, which includes a constant speed traveling control device 6 and a radar sensor 7 as a detecting device.

The automatic transmission 3 is an automatic transmission capable of steplessly changing a transmission ratio. In the automatic transmission 3, an input shaft 9 is disposed coaxially with a crankshaft 8 of the engine 2, and a driving-side shaft 10 is disposed coaxially with the input shaft 9. A driven-side shaft 11 is disposed in parallel with the driving-side shaft 10. A counter shaft 12 is disposed in parallel with the driven-side shaft 11.

A torque converter 13 is provided between the crankshaft 8 and the input shaft 9. A forward-reverse switching mechanism 14 is provided between the input shaft 9 and the driving-side shaft 10. There is also provided an oil pump 16 which is driven by rotation of the input shaft 9 transmitted via a chain 15.

In the automatic transmission 3, a driving-side pulley 17 is provided on the driving-side shaft 10, a driven-side pulley 18 is provided on a driven-side shaft 11, and a belt 19 is provided by winding on the driving-side pulley 17 and the driven-side pulley 18. The driving-side pulley 17 is formed of a driving-side fixed pulley piece 20 fixed to the driving-side shaft 10, and a driving-side movable pulley piece 21 attached to the driving-side shaft 10 to be movable in an axial direction and non-rotatable. On a back side of the driving-side movable pulley piece 21, a driving-side hydraulic chamber 23 is formed by a driving-side housing 22. The driven-side pulley 18 is formed of a driven-side fixed pulley piece 24 fixed to the driven-side shaft 11, and a driven-side movable pulley piece 25 attached to the driven-side shaft 11 to be movable in an axial direction and non-rotatable. On a back side of the driven-side movable pulley piece 25, a driven-side hydraulic chamber 27 is formed by a driven-side housing 26. In the driven-side hydraulic chamber 27, there is provided an adjusting spring 28 pushing the driven-side movable pulley piece 25 toward the driven-side fixed pulley piece 24 side.

Further, in the automatic transmission 3, the driven-side shaft 11 and the counter shaft 12 disposed in parallel with this driven-side shaft 11 are communicated with each other by a reduction gear train 29. The counter shaft 12 and a differential 30 disposed in parallel with this counter shaft 12 are communicated by a final gear train 31. The differential 30 drives a left and right driving wheels with drive shafts 32, 32, respectively.

Figure 2:
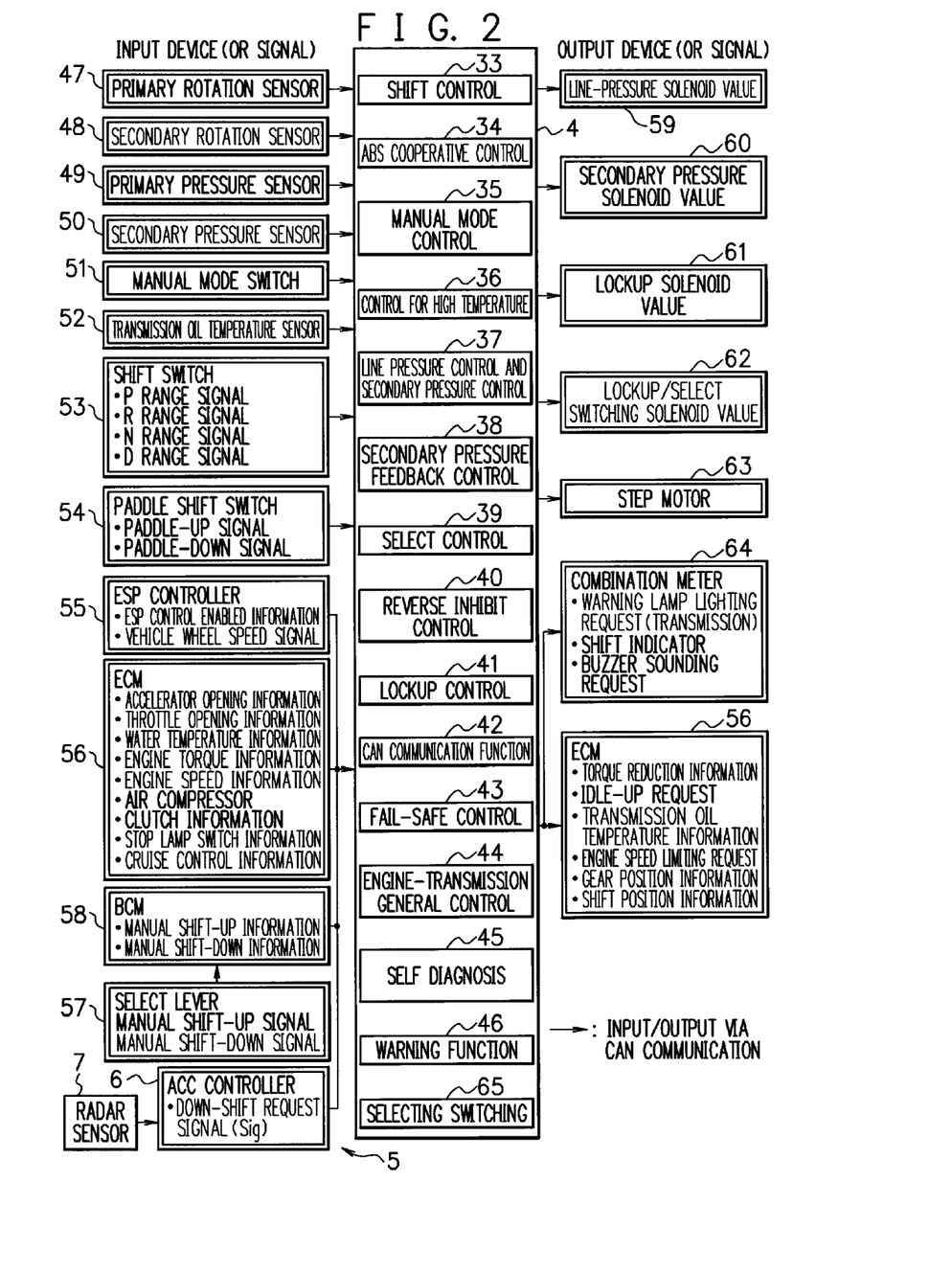
FIG. 2 is a block diagram illustrating a structure and an input/output relationship of the shift control apparatus according to the embodiment.

The transmission ratio of the automatic transmission 3 is controlled by the shift control apparatus 4. The shift control apparatus 4 includes, as illustrated in FIG. 2, a shift control unit 33, an ABS cooperative control unit 34, a manual mode control unit 35, a control unit 36 for high temperature, a line pressure control and secondary pressure control unit 37, a secondary pressure feedback control unit 38, a select control unit 39, a reverse inhibit control unit 40, a lockup control unit 41, a CAN communication function unit 42, a fail-safe control unit 43, an engine-transmission general control unit 44, a self diagnosis unit 45, and a warning function unit 46.

To an input side of the shift control apparatus 4, there are connected a primary rotation sensor 47 detecting the rotation speed of the driving-side shaft 10 (input shaft rotation speed), a secondary rotation sensor 48 detecting the rotation speed of the driven-side shaft 11 (output shaft rotation speed), a primary pressure sensor 49 detecting a line pressure supplied to the driving-side hydraulic chamber 23 as a primary pressure, a secondary pressure sensor 50 detecting a secondary pressure supplied to the driven-side hydraulic chamber 27, a manual mode switch 51 outputting a signal indicating operation of a select lever at a manual shift position, a transmission oil temperature sensor 52 detecting a transmission oil temperature of the automatic transmission 3, a shift switch 53 outputting a P (parking) range signal, R (reverse) range signal, N (neutral) range signal, and D (drive) range signal indicating an operating position of the select lever, and a paddle shift switch outputting a paddle-up signal and a paddle-down signal.

Further, to the input side of the transmission control apparatus 4, there are connected, via CAN communication, an ESP control device 55 outputting ESP control enabled information and a vehicle wheel speed signal, an ECM control device 56 outputting an accelerator opening signal, throttle opening information, water temperature information, engine torque information, engine speed information, air compressor clutch information, stop lamp switch information, and cruise control information, a BCM control device 58 to which a manual shift-up signal and a manual shift-down signal of a select lever 57 are inputted and which outputs manual shift-up information and manual shift-down information, and the constant speed traveling control device 6 of the constant speed traveling apparatus 5 outputting a constant speed traveling control request signal (ACC request signal). To the constant speed traveling control device 6, the radar sensor 7 is connected as a detecting device detecting the surrounding situation of the vehicle 1, and the apparatus operates according to the detected situation.

On the other hand, to an output side of the shift control apparatus 4, there are connected a line-pressure solenoid valve 59 controlling the line pressure, a secondary pressure solenoid valve 60 controlling the secondary pressure, a lockup solenoid valve 61 controlling a lockup clutch of the torque converter 13, a lockup/select switching solenoid valve 62 switching lockup/select of the torque converter 11, and a step motor 63 as a shift control actuator switching a hydraulic pressure for shift control.

Further, to the output side of the shift control apparatus 4, there are connected, via CAN communication, a combination meter 64 of the vehicle 1 accepting inputs of a warning lamp lighting request and a display/buzzer sounding request of a shift indicator related to the automatic transmission 3 and executing such request, and the ECM control device 56 accepting inputs of torque reduction information, idle-up request, transmission oil temperature information, engine speed limiting request, gear position information, and shift position information and executing such information.

By a CAN communication function, the shift control apparatus 4 performs CAN communication with the ESP control device 55, the ECM control device 56, the BCM control device 58, and the constant speed traveling control device 6, to communicate various information. The shift control apparatus 4 is a unit separated from the ECM control device 56 and employs CAN communication for communicating control data. By cooperative control of the engine control and the transmission control via the CAN communication, excellent shifting characteristics and low fuel consumption corresponding to the state of the vehicle 1 are achieved at the same time.

To perform control for improving shift feeling, preventing decrease in engine speed, and the like in integrated control of the engine and the automatic transmission, the shift control apparatus 4 performs mutual communication of an engine output control signal with the ECM control device 56, and performs cooperative control in real time according to the traveling state of the vehicle 1. The shift control apparatus 4 shares information of a rapid deceleration signal, a lockup enabled signal, a torque down request signal, and so on with the ECM control device 56, and receives information of a torque down enable/disable signal, a lockup enable/disable signal, and so on from the ECM control device 56.

The shift control apparatus 4 determines the states of the engine 2 and the automatic transmission 3 and the traveling state of the vehicle 1 and the operating status of the driver from various input information of accelerator opening, output shaft rotation speed of the automatic transmission 3 (rotation speed of the driven-side shaft 11), shift position signal and stop lamp switch signal of the select lever 57, and the like, and performs shift control by controlling the solenoids 59 to 62 according to a preset shift diagram.

During shift control, the shift control apparatus 4 detects the traveling state of the vehicle from the accelerator opening, throttle opening, engine speed, and vehicle speed, controls the hydraulic pressure generated by the oil pump 16 so as to have a transmission ratio suitable to the detected traveling state of the vehicle and supplies the controlled hydraulic pressure as the primary pressure and the secondary pressure to the driving-side hydraulic chamber 23 and the driven-side hydraulic chamber 27, and relatively increases/decreases respective groove widths of the driving-side pulley 17 and the driven-side pulley 18, to thereby change the radius of rotation of the belt 19.

When the select lever 57 is operated to the D range, the shift control apparatus 4 changes the transmission ratio in a speed range in which the ratio of respective radii of rotation (pulley ratio or reduction ratio) of the driving-side pulley 17 side and the driven-side pulley 18 side, on which the belt 19 is wound, ranges from the lowest ratio (the largest transmission ratio) to the highest ratio (the smallest transmission ratio), to thereby shift the automatic transmission 3. When the select lever is operated to the M (manual) range, the shift control apparatus 4 sets a fixed shift line, and performs stepwise shifting on the set shift line by operating the paddle or select lever to "+" (shift up) side or "−" (shift down) side, allowing shifting like a manual transmission.

During uphill/downhill road shift control, the shift control apparatus 4 detects a road grade from the relation between the accelerator opening and the vehicle speed, or the like, and changes the pulley ratio to a lower (lower speed) side than normal according to the grade so as to secure a driving force suitable for uphill traveling on an uphill road, or generates moderate engine braking on a downhill road. The condition for determining an uphill road is that the actual acceleration of the vehicle 1 is smaller than a reference acceleration set in advance in the shift control apparatus 4. The condition for determining a downhill road is that the actual acceleration of the vehicle is larger than the reference acceleration set in advance in the shift control apparatus 4.

During acceleration control, the shift control apparatus 4 determines the degree of acceleration request, or the like from the driver from a change in the vehicle speed or the accelerator opening, and synchronizes the vehicle speed and the increase in engine speed to perform control giving a more realistic sense of acceleration or selects a shift map by which a large driving force can be obtained also during light acceleration, thereby achieving both fuel efficiency and drivability.

During ABS cooperative control, when an ABS operating signal is inputted from the ESP control apparatus 55, the shift control apparatus 4 holds the transmission ratio to a higher (higher speed) side than normal so as not to inhibit operation of the ABS (anti-skid brake system). When a rapid torque variation at the time the grip of the wheels is recovered is transmitted to the automatic transmission 3, the secondary pressure (belt clamping pressure) of the driven-side pulley 18 becomes insufficient, the belt 19 cannot be held, and slipping occurs. Thus, the shift control apparatus 4 sets the secondary pressure relatively high. Further, the shift control apparatus 4 releases the lockup clutch of the torque converter 13 so as to reduce the input torque from the wheels to the automatic transmission 3 for protecting the driving-side pulley 17 and the driven-side pulley 18, and the belt 19.

During manual mode control, when the M (manual) range signal is detected, the shift control apparatus 4 holds the transmission ratio at this time and switches from normal shift control to manual mode control. In this state, when the paddle shift switch 54 is operated and an ON signal of a shift-up switch/shift down switch is inputted, based on this signal the shift control apparatus 4 switches a manual mode position one-by-one every time this signal is inputted (shifts the shift line by one step higher or lower), thereby performing shifting like a manual transmission.

When the paddle shift switch 54 is operated and a shift-up (+) operation is performed during the manual mode control, the shift control apparatus 4 executes a shift-up (increasing the manual mode position by one speed). However, if this causes the rotation speed of the driving-side pulley 17 after shifting to be equal to or lower than a specified value, the shift control apparatus 4 cancels the shift-up to prevent stall of the engine 2. When the paddle shift switch 54 is operated and a shift-down (−) operation is performed during the manual mode control, the shift control apparatus 4 executes a shift-down (decreasing the manual mode position by one speed).

However, if this causes the rotation speed of the driving-side pulley 17 after shifting to be equal to or higher than a specified value, the shift control apparatus 4 cancels the shift-up to protect the engine 2.

When the paddle shift switch 54 is operated in the D (drive) range, the shift control apparatus 4 switches from the normal shift control to the manual mode control. The condition for switching to temporary manual mode control is that the vehicle speed is equal to or higher than a specified value. The condition for releasing the temporary manual mode is to satisfy either that the vehicle speed is equal to or lower than a specified value, or that the paddle shift switch 54 is not operated for a predetermined time or longer or the accelerator opening is other than a specified value.

During control under high temperature, when a cooling water temperature in the engine 2 or a transmission oil temperature in the automatic transmission 3 becomes high, the shift control apparatus 4 makes the timing of shift-up early to prevent excessive increase in temperature, thereby protecting the engine 2 and the automatic transmission 3.

During normal hydraulic pressure control, the shift control apparatus 4 sets the optimum line pressure (primary pressure) and secondary pressure according to the driving state by accelerator opening, engine speed, rotation speed of the driving-side pulley 17, rotation speed of the driven-side pulley 18, stop lamp switch signal, shift switch signal, lockup signal, and signals of battery voltage, target transmission ratio, oil temperature, and hydraulic pressure.

During secondary pressure feedback control, the shift control apparatus 4 detects the secondary pressure using a hydraulic pressure sensor in the normal hydraulic pressure control and in hydraulic pressure control when a selection is made, and performs feedback control, thereby setting a more precise secondary pressure.

During select control, when a selecting operation from the N (P) range to the D (R) range is performed, the shift control apparatus 4 sets the optimum operating pressure for alleviating a shock generated by selection from the accelerator opening, engine speed, and rotation speed of the driven-side pulley 18.

During reverse inhibit control, when a selecting operation of the select lever to the R range is performed despite that the vehicle is traveling (at a forward traveling vehicle speed of 8 km/h or higher, for example), the shift control apparatus 4 prohibits shifting of the automatic transmission 3 to the reverse, thereby protecting the inside of the automatic transmission 3.

During lockup control, when the condition for executing lockup is met based on information of vehicle speed, transmission oil temperature, rotation speed of the driving-side pulley 17, and the like, the shift control apparatus 4 outputs a signal to the lockup solenoid valve 61 to engage the lockup clutch in the torque converter 13. During acceleration, transmission efficiency is improved by enlarging the lockup control operating range to allow operating from a lower speed range than in conventional vehicles, and fuel efficiency is improved by suppressing increase in engine speed. During deceleration, transmission efficiency is improved by enlarging the lockup control operating range to allow operating from a lower speed range, and fuel efficiency is improved by enlarging a fuel cut operating area. The conditions for executing lockup control are to satisfy that it is the D range or the M range, the rotation speed of the driving-side shaft 10 and the vehicle speed are equal to or higher than specified values, and the transmission oil temperature of the automatic transmission 3 and the cooling water temperature of the engine 2 is equal to or higher than specified values. The condition for releasing lockup control is that one of the executing conditions is not satisfied.

The shift control apparatus 4 of the automatic transmission 3 according to this embodiment is able to communicate with the constant speed traveling apparatus 5. The constant speed traveling control device 6 of the constant speed traveling apparatus 5 performs constant speed traveling control (ACC: active cruise control) to travel at a preset speed when there is no preceding vehicle, or to maintain a preset inter-vehicle distance when there is a preceding vehicle, according to the surrounding situation of the vehicle detected by the radar sensor 7.

The shift control apparatus 4 of the automatic transmission 3 according to this embodiment has a selecting switching unit 65 which selects and switches a shift map based on a shift-down request signal from the constant speed traveling control device 6. The shift control apparatus 4 has at least shift maps corresponding to normal, deceleration, and acceleration, and selects one of them based on the shift-down request signal. In the acceleration shift map, the input shaft rotation speed (rotation speed of the driving-side shaft 10) corresponding to the accelerator opening is set entirely to a lower side as compared to the normal shift map. On the other hand, in the deceleration shift map, the transmission ratio on the highest side is set entirely to a lower side as compared to the normal shift map.

Next, operation of the shift control apparatus 4 of the automatic transmission 3 according to this embodiment will be described.

During control of selecting a shift map in the constant speed traveling control by the constant speed traveling control device 6, the shift control apparatus 4 of the automatic transmission 3 selects the optimum shift map corresponding to the traveling situation according to the shift-down request signal of the constant speed traveling control device 6, and performs control to assist in improvement of following ability and feeling of the constant speed traveling control device 6, and in hunting prevention.

Figure 3:
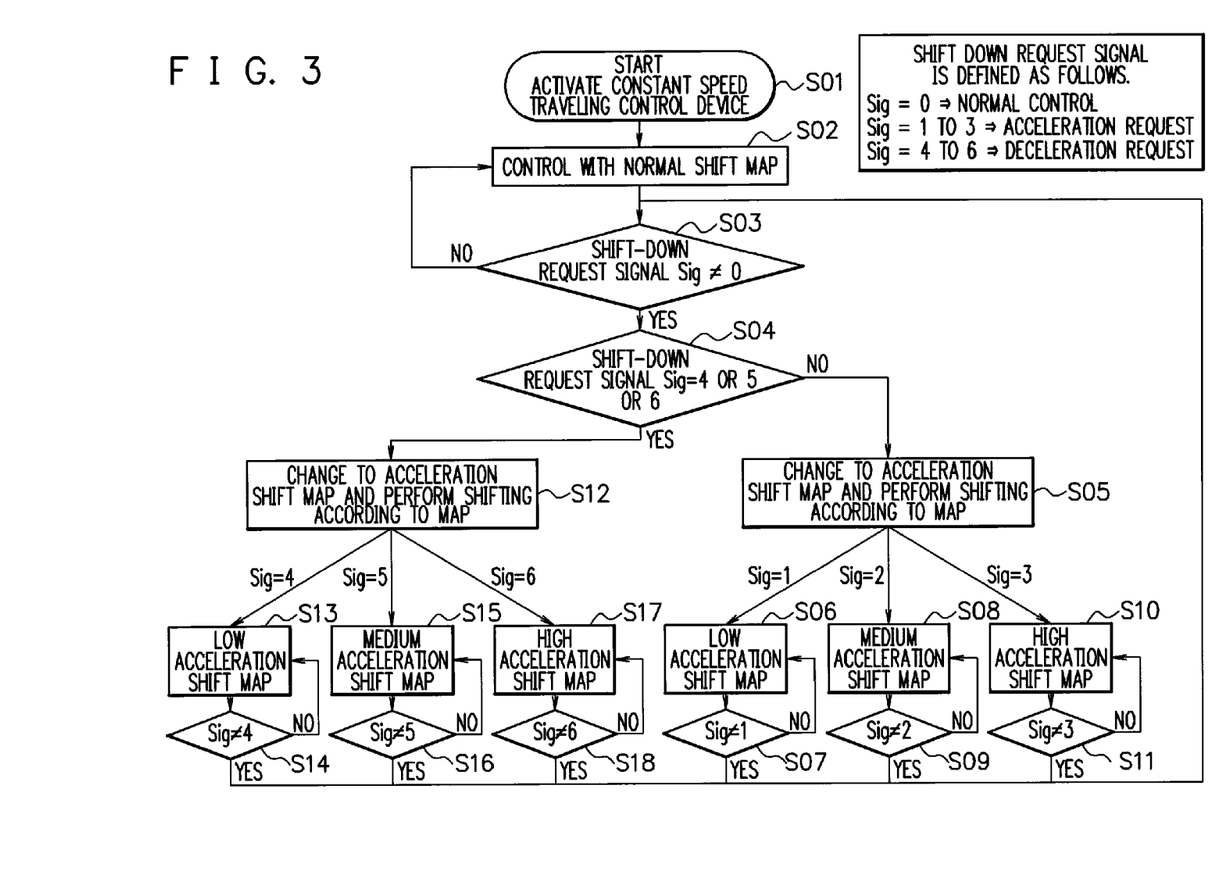
FIG. 3 is a flowchart of shift control in constant speed traveling control by the shift control apparatus according to the embodiment.

As an example, control to select a shift map from three acceleration shift maps (low, medium, and high) and three deceleration shift maps (low, medium, and high) according to the shift-down request signal of the constant speed traveling control device 6, will be described. FIG. 3 illustrates a flowchart of shift control in the constant speed traveling control by the shift control apparatus 4 of the automatic transmission 3. In FIG. 3, the shift-down request signal Sig=0 is assigned with "normal control", signals Sig=1 to 3 are assigned as "1: low acceleration request, 2: medium acceleration request, and 3: high acceleration request", and signals Sig=4 to 6 are assigned as "4: low acceleration request, 5: medium acceleration request, and 6: high acceleration request".

Figure 4:
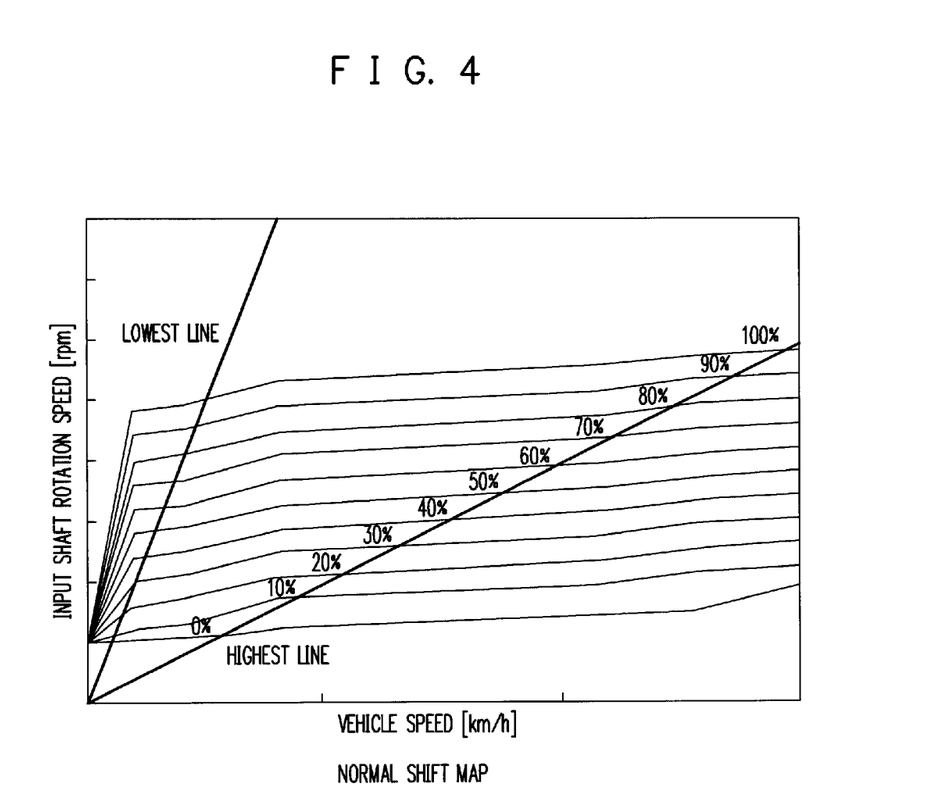
FIG. 4 is a diagram illustrating an example of a normal shift map.

During the constant speed traveling control, the constant speed traveling control device 6 transmits the shift-down request signal Sig=0 for acceleration/deceleration which can be handled with the normal shift map as a base, and changes the Sig value according to the traveling situation such as following a preceding vehicle or a change in grade value. The shift control apparatus 4 switches the shift map of shift control accompanying a change in the Sig value as follows (1) Sig=0: normal traveling Shifting is performed according to the normal shift map (for example, see FIG. 4)

(2) Sig=1 to 3: when acceleration is requested

Figure 5:
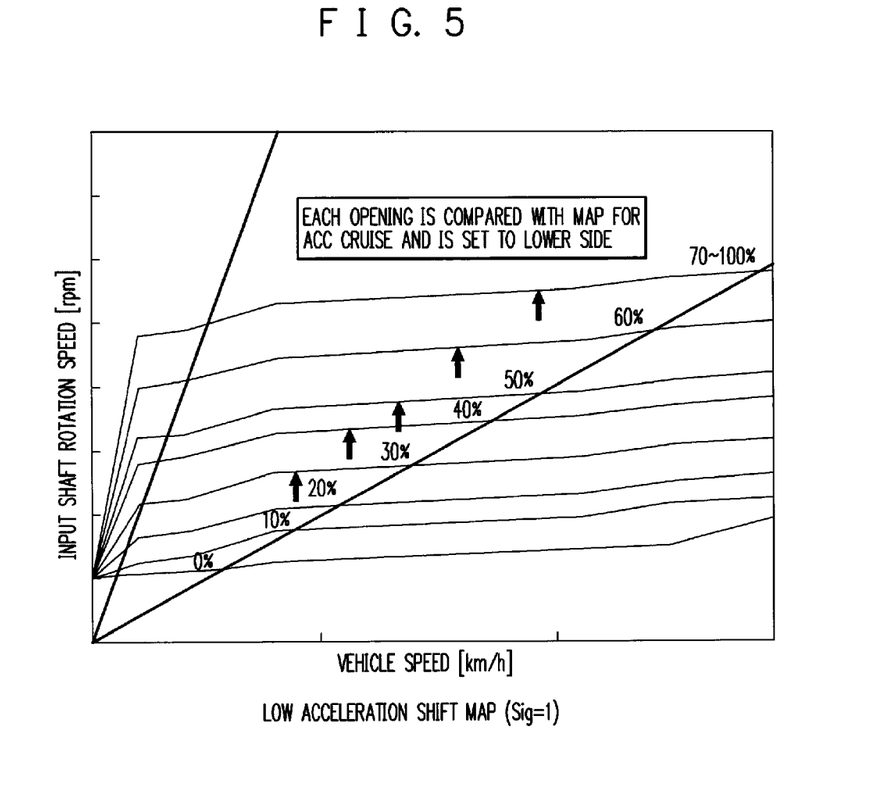
FIG. 5 is a diagram illustrating an example of a low acceleration shift map.

The shift map is changed to the acceleration shift map (low, medium, or high) corresponding to the Sig value, and shifting is performed according to the acceleration shift map (for example, see FIG. 5 for Sig=1).

(3) Sig=4 to 6: when deceleration is requested

Figure 6:
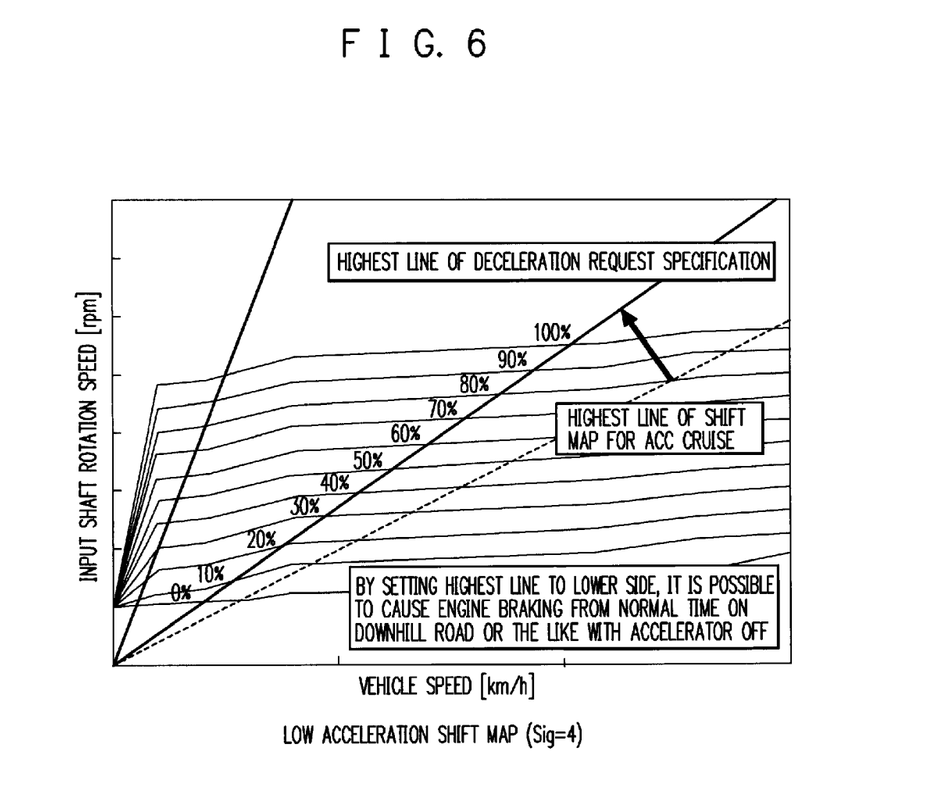
FIG. 6 is a diagram illustrating an example of a low deceleration shift map.

The shift map is changed to the deceleration shift map (low, medium, or high) corresponding to the Sig value, and shifting is performed according to the deceleration shift map (for example, see FIG. 6 for Sig=4).

The normal shift map (see FIG. 4) is set based on the shift-down request signal Sig (=0) of the constant speed traveling control device 6, but it is not restrictive. It is also possible to set the normal shift map based on a request signal separated from the shift-down request signal.

In the shift map, when the transmission ratio is constant, it becomes linear (proportional relation) with respect to the vehicle speed. A ratio when the transmission ratio is lowest (reduction ratio is highest) is designated as a lowest side transmission ratio, and a ratio when the transmission ratio is highest (reduction ratio is lowest, or becomes speed increase) is designated as a highest side transmission ratio.

In the acceleration shift map (see FIG. 5), the input shaft rotation speeds (rotation speeds of the driving-side shaft 10) corresponding to 0%, 10%, . . . , 100% of the accelerator opening (throttle opening) are set entirely to a lower side as compared to the normal shift map. Thus, the transmission ratio corresponding to the same accelerator opening (throttle opening) is made lower as compared to the normal shift map to increase the drive shaft torque, thereby securing acceleration performance. In addition, in the three acceleration shift maps, a tendency to be set entirely to a lower side as compared to the normal shift map increases in order of low→medium→high.

In the deceleration shift map (see FIG. 6), by setting the highest side transmission ratio entirely to the lower side as compared to the normal shift map, the transmission ratio to be the upper limit corresponding to the same accelerator opening (throttle opening) is made lower as compared to the normal shift map, thereby securing deceleration performance. During deceleration, the accelerator opening (throttle opening) becomes small, and hence the traveling speed to meet the highest side transmission ratio which is set lower becomes small. Thus, the deceleration can be increased. In addition, in the three deceleration shift maps, a tendency of the highest side transmission ratio to be set entirely to the lower side increases as compared to the normal shift map in order of low→medium→high.

During the operation of shift control by the shift control apparatus 4 of the automatic transmission 3, as illustrated in FIG. 3, when the control starts and the constant speed traveling control device 6 is activated (step S01), control is performed with the normal shift map (step S02), and determines whether there is a shift-down request signal (Sig≠0) (step S03). When this determination (step S03) is NO, the flow returns to the processing (step S02). When this determination (step S03) is YES, it is determined whether the Sig value of the shift-down request signal is 4, 5, or 6 (step S04).

When this determination (step S04) is NO, the shift map is changed to the acceleration shift map and shifting is performed according to the selected and switched acceleration shift map (step S05). In the shifting with the acceleration shift map (step S05), when the Sig value is 1 (Sig=1), the low acceleration shift map is selected to switch to this map and shifting is performed (step S06), and then it is determined whether the Sig value is other than 1 (Sig≠1) (step S07). When this determination (step S07) is NO, the flow returns to the shifting with the low acceleration shift map (step S06). When this determination (step S07) is YES, the flow returns to the determination of the shift-down request signal (step S03).

In the shifting with the acceleration shift map (step S05), when the Sig value is 2 (Sig=2), the medium acceleration shift map is selected to switch to this map and shifting is performed (step S08), and then it is determined whether the Sig value is other than 2 (Sig≠2) (step S09). When this determination (step S09) is NO, the flow returns to the shifting with the medium acceleration shift map (step S08). When this determination (step S09) is YES, the flow returns to the determination of the shift-down request signal (step S03).

In the shifting with the acceleration shift map (step S05), when the Sig value is 3 (Sig=3), the high acceleration shift map is selected to switch to this map and shifting is performed (step S10), and then it is determined whether the Sig value is other than 3 (Sig≠3) (step S11). When this determination (step S11) is NO, the flow returns to the shifting with the high acceleration shift map (step S10). When this determination (step S11) is YES, the flow returns to the determination of the shift-down request signal (step S03).

On the other hand, when the determination (step S04) is YES, the shift map is changed to the deceleration shift map and shifting is performed according to the selected and switched deceleration shift map (step S12). In the shifting with the deceleration shift map (step S12), when the Sig value is 4 (Sig=4), the low deceleration shift map is selected to switch to this map and shifting is performed (step S13), and then it is determined whether the Sig value is other than 4 (Sig≠4) (step S14). When this determination (step S14) is NO, the flow returns to the shifting with the low deceleration shift map (step S13). When this determination (step S14) is YES, the flow returns to the determination of the shift-down request signal (step S03).

In the shifting with the deceleration shift map (step S12), when the Sig value is 5 (Sig=5), the medium deceleration shift map is selected to switch to this map and shifting is performed (step S15), and then it is determined whether the Sig value is other than 5 (Sig≠5) (step S16). When this determination (step S16) is NO, the flow returns to the shifting with the medium deceleration shift map (step S15). When this determination (step S16) is YES, the flow returns to the determination of the shift-down request signal (step S03).

In the shifting with the deceleration shift map (step S12), when the Sig value is 6 (Sig=6), the high deceleration shift map is selected to switch to this map and shifting is performed (step S17), and then it is determined whether the Sig value is other than 6 (Sig≠6) (step S18). When this determination (step S18) is NO, the flow returns to the shifting with the high deceleration shift map (step S17). When this determination (step S18) is YES, the flow returns to the determination of the shift-down request signal (step S03).

In addition, the control flowchart of FIG. 3 is finished when the start switch (ignition switch) is turned off.

Thus, the shift control apparatus 4 of the automatic transmission 3 has a plurality of shift maps, and when the constant speed traveling control device 6 of the constant speed traveling apparatus 5 outputs a shift-down request signal according to the surrounding situation of the vehicle detected by the radar sensor 7, the apparatus selects and switches to the corresponding shift map from the plurality of shift maps based on the shift-down request signal from this constant speed traveling control device 6, and performs shift control. Thus, the shift control apparatus 4 of the automatic transmission 3 is able to perform switching of shift control operation according to the shift-down request from the constant speed traveling control device 6. Accordingly, the shift control apparatus 4 of the automatic transmission 3 is able to perform shift control with an appropriate speed controllability in many traveling situations corresponding to the variety of these situations, to particularly have a speed controllability ensuring sufficient acceleration performance to keep up with the flow of surrounding vehicles, and to perform shift control while suppressing intervention of braking control (brake control) as much as possible.

The shift control apparatus 4 has, as a plurality of shift maps, at least shift maps corresponding to normal, deceleration, and acceleration (normal shift map, deceleration shift map, and acceleration shift map). The shift-down request signal from the constant speed traveling control device 6 operates to select and specify one of the normal shift map, the deceleration shift map, and the acceleration shift map. Thus, the shift control apparatus 4 of the automatic transmission 3 is able to perform switching of shift control operation according to the shift-down request from the constant speed traveling control device 6.

Further, in the acceleration shift map among the plurality of shift maps, the shift control apparatus 4 sets the input shaft rotation speed (rotation speed of the driving-side shaft 10) of the automatic transmission 3 corresponding to the accelerator opening entirely to a transmission ratio on a lower side as compared to the normal shift map. On the other hand, in the deceleration shift map among the plurality of shift maps, the shift control apparatus sets the highest side transmission ratio entirely to a transmission ratio on a lower side as compared to the normal shift map. Accordingly, in the shift control apparatus 4 of the automatic transmission 3, deceleration and acceleration based on the shift-down request signal from the constant speed traveling control device 6 can be set most suitably. Thus, control hunting or the like does not occur, and an excellent following ability with respect to a preceding vehicle and drivability can both be achieved.

The above-described embodiment is in the mode such that the shift-down request signal Sig is outputted from the constant speed traveling control device 6, and the shift control apparatus 4 selects the shift map according to this shift-down request signal Sig, but it is not restrictive. For example, it is possible to employ a mode such that a requested acceleration is outputted from the constant speed traveling control device 6, and the shift control apparatus 4 determines and selects the shift map according to this requested acceleration, so as to perform control.

The above-described embodiment is in the mode such that a segmented shift-down request signal Sig is outputted from the constant speed traveling control device 6, and the shift control apparatus 4 selects the shift map according to this shift-down request signal Sig, but it is not restrictive. For example, it is possible to employ a mode such that the shift control apparatus 4 determines a grade by an uphill/downhill road shift control function, a simplified shift-down request signal Sig or a requested acceleration is outputted from the constant speed traveling control device 6, and the shift control apparatus 4 determines and selects the shift map according to the determined grade and the simplified shift-down request signal Sig or the requested acceleration, so as to perform control.

Further, the above-described embodiment is in the mode such that the shift map which the shift control apparatus 4 has is formed of a normal shift map and various types of shift maps (three acceleration shift maps and three deceleration shift maps, six maps in total) corresponding to shift-down requests, but it is not restrictive. For example, a shift map for a low fuel consumption mode may be included in one or both of the normal shift map and the various types of shift maps corresponding to shift-down requests.

It is also possible that the shift map for low fuel consumption is provided as described above, a part or all of a normal base shift map and various types of shift maps corresponding to shift-down requests is or are set to a following-ability priority mode, and a selecting and switching switch is provided to allow a person to select one of them.

Note that a shift control apparatus of an automatic transmission to which the present invention is applied can be formed specifically of a computer apparatus or a computer system including a CPU, a RAM, a ROM, and so on. Therefore, a program product itself to be installed in a computer apparatus or a computer system for achieving various functions and processing of the present invention is included in the present invention.

Switching of shift control operation of the shift control apparatus according to a shift-down request from the constant speed traveling control device according to the present invention is also applicable to other automatic transmissions.

According to the present invention, switching of shift control operation according to a shift-down request from the constant speed traveling control device can be performed. Accordingly, shift control with an appropriate speed controllability in many traveling situations corresponding to the variety of these situations can be performed. Particularly, a speed controllability ensuring sufficient acceleration performance to keep up with the flow of surrounding vehicles can be provided. Shift control can be performed while suppressing intervention of braking control (brake control) as much as possible.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A shift control apparatus of an automatic transmission in a vehicle including a constant speed traveling apparatus, which has a detecting device detecting a surrounding situation of the vehicle and operates so as to travel at a preset speed when there is no preceding vehicle, or to maintain a preset inter-vehicle distance when there is a preceding vehicle, according to the detected situation, and an automatic transmission which comprises an input shaft and a driving-side shaft which are connected to a crank shaft of an engine and is capable of steplessly changing a transmission ratio, the shift control apparatus controlling the automatic transmission according to a shift map for changing the transmission ratio according to a traveling state by a rotation speed of the input shaft, an accelerator opening, and a speed of the vehicle, the shift control apparatus comprising:
   a plurality of shift maps; and
   a switching and selecting unit selecting and switching to one of the shift maps based on a shift-down request signal, which is outputted by a constant speed traveling control device of the constant speed traveling apparatus, according to the situation detected by the detecting device.

2. The shift control apparatus of the automatic transmission according to claim 1, further comprising:
   at least a normal shift map, an acceleration shift map, a deceleration shift map as the plurality of shift maps,
   wherein the selecting and switching unit selects one of the shift maps based on the shift-down request signal from the constant speed traveling control device.

3. The shift control apparatus of the automatic transmission according to claim 2,
   wherein in an acceleration shift map out of the plurality of shift maps, the rotation speed of the input shaft corresponding to an accelerator opening is set entirely to a transmission ratio on a lower side as compared to a normal shift map.

4. The shift control apparatus of the automatic transmission according to claim 2,
wherein in a deceleration shift map out of the plurality of shift maps, a transmission ratio on a highest side is set entirely to a transmission ratio on a lower side as compared to a the normal shift map.

5. A shift control apparatus of an automatic transmission in a vehicle, comprising:
a constant speed traveling apparatus that has a detecting device detecting a surrounding situation of the vehicle and operates so as to travel at a preset speed when there is no preceding vehicle, or to maintain a preset inter-vehicle distance when there is a preceding vehicle, according to the detected situation;
an automatic transmission that includes an input shaft and a driving-side shaft, which are connected to a crank shaft of an engine, and is capable of steplessly changing a transmission ratio, the shift control apparatus controlling the automatic transmission according to a shift map for changing the transmission ratio according to a traveling state by a rotation speed of the input shaft, an accelerator opening, and a speed of the vehicle;
a plurality of shift maps; and
a switching and selecting unit selecting and switching to one of the shift maps based on a shift-down request signal, which is outputted by a constant speed traveling control device of the constant speed traveling apparatus, according to the situation detected by the detecting device.

* * * * *